United States Patent
Kusumoto et al.

(10) Patent No.: US 6,621,015 B2
(45) Date of Patent: Sep. 16, 2003

(54) ELECTRONIC BALANCE

(75) Inventors: Tetsuro Kusumoto, Kyoto (JP);
Nobuyuki Yoshikuwa, Kyoto (JP)

(73) Assignee: Shimazu Corporation, Kyoto (JP)

( * ) Notice: Subject to any disclaimer, the term of this patent is extended or adjusted under 35 U.S.C. 154(b) by 161 days.

(21) Appl. No.: 09/984,510

(22) Filed: Oct. 30, 2001

(65) Prior Publication Data

US 2002/0050411 A1 May 2, 2002

(30) Foreign Application Priority Data

Nov. 2, 2000 (JP) ........................................ 2000-335712

(51) Int. Cl.⁷ ................................................ G01G 7/02
(52) U.S. Cl. ........................ 177/164; 177/229; 177/211; 177/253; 177/262; 73/1.13
(58) Field of Search .................................. 177/164, 168, 177/169, 170, 171, 173, 210 GM, 210 R, 211, 212, 229, 253, 262, 151, 152, 50; 73/1.13

(56) References Cited

U.S. PATENT DOCUMENTS

| | | | | |
|---|---|---|---|---|
| 1,080,398 A | * | 12/1913 | Wright | 177/262 |
| 1,725,503 A | * | 8/1929 | Bergen | 177/262 |
| 4,558,757 A | * | 12/1985 | Mori et al. | 177/211 |
| 4,909,338 A | * | 3/1990 | Vitunic et al. | 177/50 |
| 4,951,765 A | * | 8/1990 | Naito et al. | 177/211 |
| 4,979,580 A | * | 12/1990 | Lockery | 177/211 |

\* cited by examiner

Primary Examiner—Randy Gibson
(74) Attorney, Agent, or Firm—Rader, Fishman & Grauer PLLC

(57) ABSTRACT

An electronic balance is provided in which influences due to a four-corner error can be eliminated from an indicated value of weighing without strictly conducting mechanical adjustment, so that correct indication can be always performed.

As means for attaining the object, a dish support 2 interposed between a weighing dish 3 and a load detecting mechanism 1 is configured by four cantilever beams 2a to 2d which respectively elongate in four directions, the weighing dish 3 is supported by the vicinities of tip ends of the cantilever beams 2a to 2d, and deflection amount detecting means 5a to 5d for respectively detecting deflection amounts of the cantilever beams 2a to 2d are disposed. The position of the center of gravity of a load on the weighing dish 3 is calculated by using outputs of the deflection amount detecting means 5a to 5d. An output of the load detecting mechanism 1 is corrected by using previously stored relationships between the position of the center of gravity of a load and a four-corner error, to obtain an indicated value of weighing.

5 Claims, 4 Drawing Sheets

ELECTRONIC BALANCE

BACKGROUND OF THE INVENTION

The present invention relates to an electronic balance, and more particularly to an electronic balance in which a work of adjusting a four-corner error can be easily conducted or can be eliminated. The invention can be applied to a so-called electronic balance in which an electromagnetic force balancing mechanism that generates an electromagnetic force opposing a load on a weighing dish, and that detects the load on the weighing dish on the basis of the magnitude of the generated electromagnetic force is used as a load detecting mechanism, and also to a so-called electronic scale which has a load detecting mechanism including a load sensor such as a load cell.

Usually, an electronic balance or an electronic scale comprises a load detecting mechanism which outputs a signal corresponding to a load applied to a load sensing portion, and has a structure in which the load detecting mechanism supports a weighing dish via a dish support. From an output of the load detecting mechanism, calculating means such as a microcomputer calculates the value of the load on the weighing dish.

In such an electronic balance or an electronic scale, usually, a configuration including a Roberval mechanism (also called as a parallel guide) is often employed as a load detecting mechanism in order to eliminate an error due to the position of the center of gravity of a load on a weighing dish, i.e., a four-corner error. A Roberval mechanism has a structure in which a stationary column fixed to a balance base or the like, and a movable column attached to a dish support are coupled to each other via two upper and lower parallel beams that comprise flexible portions in both ends, respectively. Even when a load is applied to a position deviated from the center of the weighing dish in an arbitrary direction, the load detecting mechanism is enabled to output a given signal corresponding to the load by adjusting the parallelism between the upper and lower beams, in other words, by adjusting the vertical gaps between the flexible portions which are disposed in the ends of the upper and lower beams, so as to be equal to each other. As a result, a four-corner error can be eliminated.

A work of mechanically adjusting the parallelism between the upper and lower beams in a Roberval mechanism so as to eliminate such a four-corner error is conducted while actually changing the load applying position on a weighing dish after a balance is assembled. The work requires special technique. Furthermore, phenomena that a four-corner error does not appear evenly in a diagonal direction of the weighing dish, and that a four-corner error fails to be in proportional to the magnitude of the load and the deviation distance (the distance from the center of the weighing dish to the center of gravity of the load) occur. In such a case, it is substantially impossible to strictly eliminate a four-corner error by mechanical adjustment using a Roberval mechanism.

SUMMARY OF THE INVENTION

The invention has been conducted in view of such circumstances. It is an object of the invention to provide an electronic balance in which influences due to a four-corner error can be eliminated from an indicated value of weighing without strictly conducting mechanical adjustment, so that correct indication can be always performed.

In order attain the object, the electronic balance of the invention is an electronic balance comprising: a load detecting mechanism which supports a weighing dish via a dish support, and which outputs a signal corresponding to a load on the weighing dish; and calculating means for calculating a value of the load on the weighing dish by using an output of the load detecting mechanism, wherein the dish support comprises four cantilever beams which respectively elongate in four directions in a horizontal plane, vicinities of tip ends of the cantilever beams respectively supporting corners of the weighing dish, and the electronic balance further comprises: deflection amount detecting means for individually detecting a deflection amount of each of the cantilever beams; and four-corner error correcting and calculating means for calculating a position of a center of gravity of the load on the weighing dish by using a result of the detection of deflection amounts of the cantilever beams, for, by using previously stored relationships between a position of a center of gravity of a load and a four-corner error, correcting the output of the load detecting mechanism, and for causing the corrected output to be used in the calculation of the value of the load by the calculating means.

In the invention, the position of the center of gravity of the load placed on the weighing dish is detected, and the output of the load detecting mechanism is corrected in accordance with the detected position, whereby a four-corner error can be eliminated without strictly conducting mechanical adjustment by means of a Roberval mechanism.

When cantilever beams elongating respectively in four directions are disposed on the dish support that receives the weighing dish and the weighing dish is supported by the vicinities of the tip ends of the cantilever beams, each of the cantilever beams is deflected by an amount corresponding to the position of the center of gravity of the load on the weighing dish. The deflection amounts of the cantilever beams are respectively detected by the deflection amount detecting means. From ratios of the deflection amounts, the position of the center of gravity of the load on the weighing dish can be obtained.

Furthermore, the four-corner error (rate) of the output of the load detecting mechanism is uniquely determined in accordance with the position of the center of gravity of the load on the weighing dish.

Therefore, relationships between the position of the center of gravity of a load onto the weighing dish and a four-corner error are previously measured and stored. In an actual use of the electronic balance, when a sample or the like is placed in any position on the weighing dish in order to weigh the load due to the sample, the position of the center of gravity of the sample on the weighing dish is obtained by calculation on the basis of results of detections of the deflection amounts of the cantilever beams which are conducted by the deflection amount detecting means. By using a result of the calculation and the contents of the above-mentioned storing, it is possible to know a four-corner error contained in the output of the load detecting mechanism. A correction calculation of eliminating an amount corresponding to the error from the output of the load detecting mechanism is performed, and a result of the calculation is used in the calculation of the value of the load by the calculating means. Therefore, although the actual output of the load detecting mechanism contains a four-corner error, the indicated value of weighing is a correct value which does not contain the four-corner error.

DETAILED DESCRIPTION OF PREFERRED EMBODIMENTS

Hereinafter, an embodiment of the invention will be described with reference to the accompanying drawings.

Figure 1:
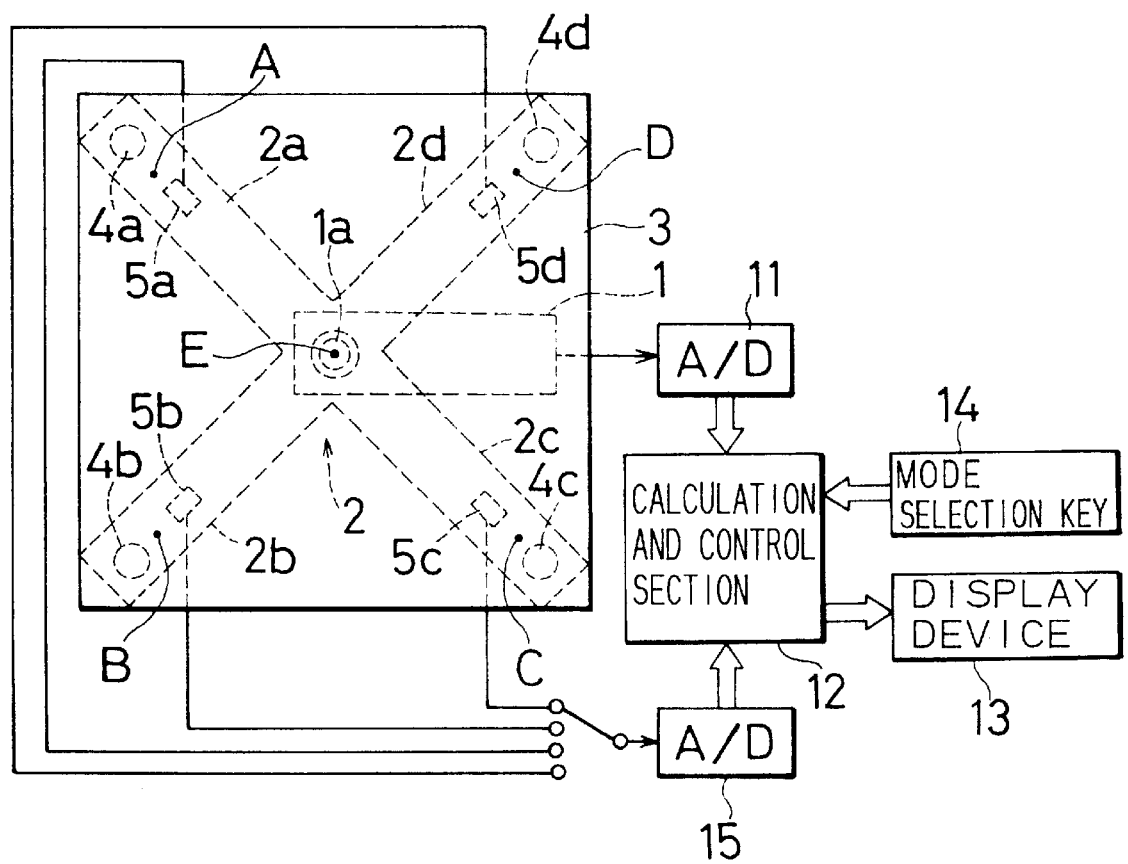
FIG. 1 is a diagram of an embodiment of the invention, combined with a diagrammatic plan view showing the mechanical configuration, and a block diagram showing the electrical configuration.
Figure 2:
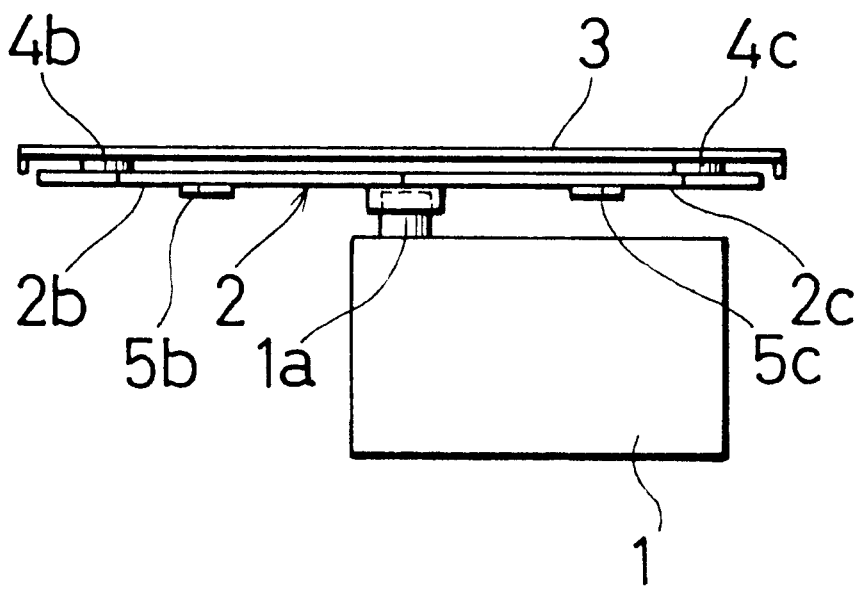
FIG. 2 is a diagrammatic front view of the mechanical configuration of the embodiment of FIG. 1.

FIG. 1 is a diagram of an embodiment of the invention, combined with a diagrammatic plan view showing the mechanical configuration, and a block diagram showing the electrical configuration, and FIG. 2 is a diagrammatic front view of the mechanical configuration.

A load detecting mechanism 1 has a known configuration having, for example, an electromagnetic force balancing mechanism and a Roberval mechanism. Although detailed description is omitted, the configuration will be schematically described. A dish support 2 is attached to a movable column of the Roberval mechanism, and a weighing dish 3 is supported via the dish support 2. A load on the weighing dish 3 is transmitted through the dish support 2 to the movable column of the Roberval mechanism, thereby inclining a balance lever coupled to the movable column. The inclination of the balance lever is detected by a sensor. An electromagnetic force is generated so that the inclination of the lever is always 0, thereby balancing the mechanism. The value of a current which is required for generating an electromagnetic force for maintaining the balancing state is converted into a voltage signal by a measuring resistance, and the signal is output as a load detection signal corresponding to the load on the weighing dish 3.

The load detection signal output from the load detecting mechanism 1 is digitized by an A–D converter 11, and then captured moment by moment into a calculation and control section 12. The calculation and control section 12 is configured mainly by a microcomputer having a CPU, a ROM, and a RAM, and includes also a nonvolatile memory. A display device 13, a mode selection key 14, and the like are connected to the calculation and control section 12. The display device 13 is used for displaying the weighed value of the load on the weighing dish 3, and the mode selection key 14 is a key for selecting either of a weighing program and an adjustment program which will be described later, to be implemented.

The dish support 2 is configured by four cantilever beams 2a to 2d which respectively elongate in four directions that are perpendicular to one another, in a state where the beams are supported in a cantilevered manner by a support rod 1a disposed at the top of the movable column of the Roberval mechanism serving as a load sensing portion of the load detecting mechanism 1. Spacers 4a to 4d are fixed to upper faces in the vicinities of tip ends of the cantilever beams 2a to 2d, respectively. The weighing dish 3 is supported at its four corners via the spacers 4a to 4d by the beams.

In the cantilever beams 2a to 2d, deflection amount sensors 5a to 5d (for example, strain gauges) for detecting deflection amounts of the respective beams are disposed. The outputs of the deflection amount sensors 5a to 5d are digitized by an A–D converter 15, and then captured moment by moment into the calculation and control section 12.

In addition to the weighing program which is used in a usual weighing process, the adjustment program which is used in a process of adjusting a four-corner error is installed into the calculation and control section 12. Hereinafter, the programs will be described.

Figure 3:
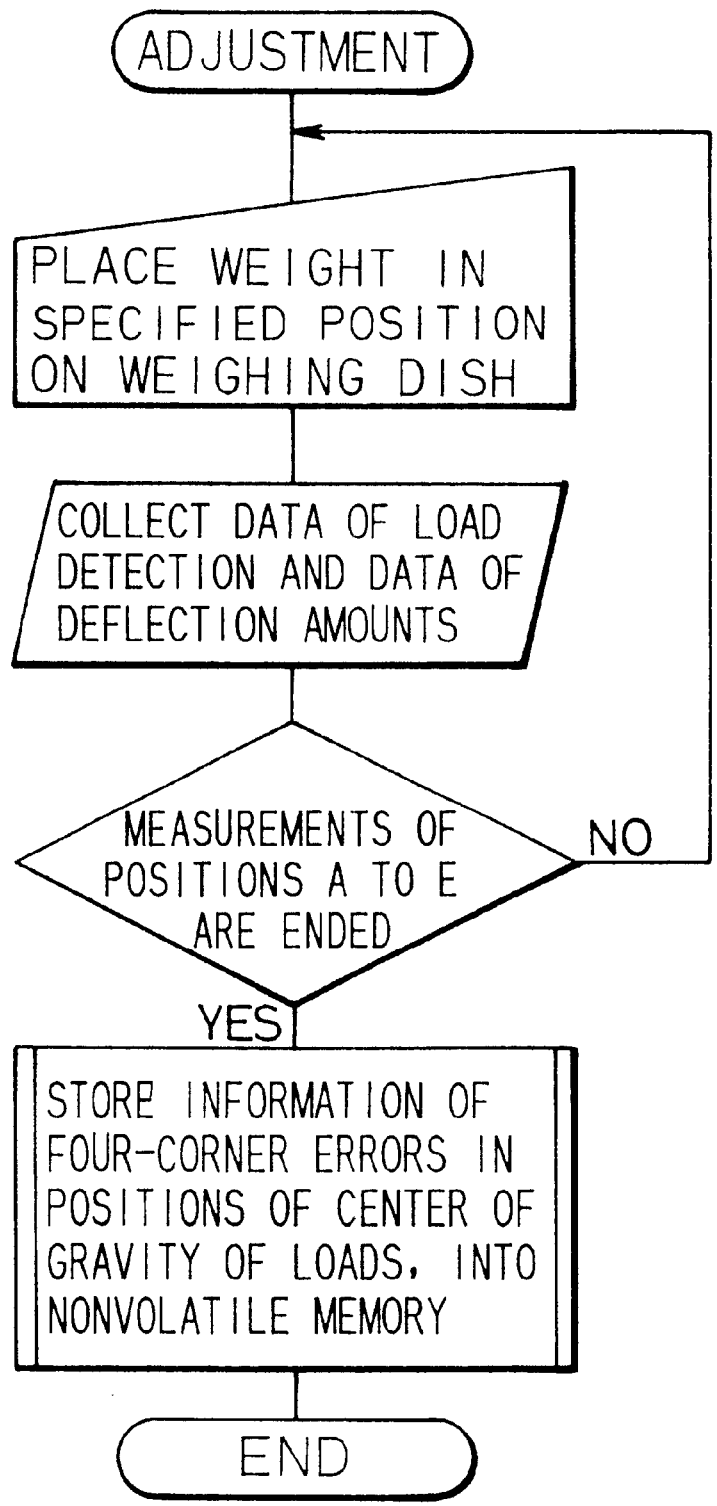
FIG. 3 is a flowchart showing contents of an adjustment program which is previously written into a calculation and control section 12 of the embodiment of the invention.

FIG. 3 is a flowchart showing contents of the adjustment program. The program is implemented in the process of adjusting a four-corner error at shipment of the balance or at a necessary timing. In the adjustment program, four example, the same load such as a weight is placed in each of plural positions indicated by A to E in FIG. 1 and including the center of the weighing dish 3 (therefore, directly above the support rod 1a) and the four corners. With respect to each of the positions, the output of the load detecting mechanism 1, and the outputs of the deflection amount sensors 5a to 5d are collected.

The ratio of the outputs of the deflection amount sensors 5a to 5d depends on the position of the center of gravity of the load on the weighing dish 3. From the outputs of the deflection amount sensors 5a to 5d, the position of the center of gravity of the load can be obtained by a simple calculation. The difference in the outputs of the load detecting mechanism 1 for the load positions is caused by a four-corner error of the load detecting mechanism 1 with respect to the position of the center of gravity of the load. From the data which are collected as a result of the above-mentioned operation, therefore, it is possible to obtain the position of the center of gravity of the load and the rate of a four-corner error corresponding to the position. The information is stored into the nonvolatile memory, and the adjustment program is then ended.

Figure 4:
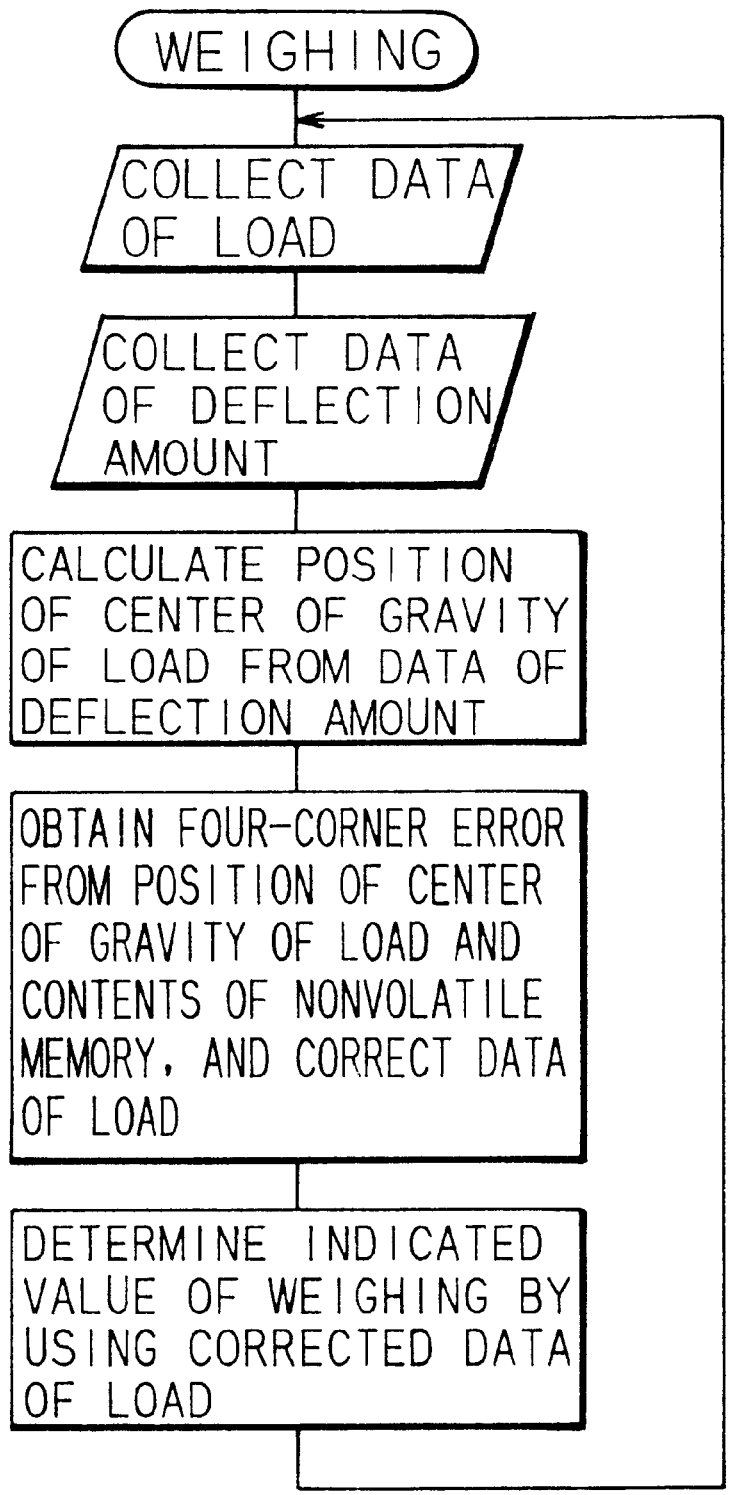
FIG. 4 is a flowchart showing contents of a weighing program which is previously written into the calculation and control section 12 of the embodiment of the invention.

FIG. 4 is a flowchart showing contents of the weighing program. The program is implemented in the usual weighing process. In the program for measurement, the output of the load detecting mechanism 1 is collected moment by moment in a state where an article such as a sample to be measured is placed on the weighing dish 3, and the position of the center of gravity of the article on the weighing dish 3 is calculated from the outputs of the deflection amount sensors 5a to 5d. Then, the output of the load detecting mechanism 1 is corrected by using the relationships between the position of the center of gravity and the rate of a four-corner error which are stored in the nonvolatile memory. Then, a known calculation in which, for example, the corrected output of the load detection is averaged and the averaged output is multiplied with a sensitivity coefficient is performed to calculate a value of weighing which is to be displayed on the display device 13. As a result of implementation of the adjustment program, with respect to the relationships between the position of the center of gravity of the load and a four-corner error which are stored in the nonvolatile memory, there are only data of a limited number of positions of the center of gravity. By contrast, in an actual measurement on a sample or the like, the position of the center of gravity exists in an arbitrary position on the weighing dish 3. Therefore, a four-corner error cannot be immediately corrected on the basis of the stored contents of the nonvolatile memory. By using the relationships between plural positions of the center of gravity and a four-corner error which are stored in the nonvolatile memory, however, the relationship between a four-corner error and the position of the center of gravity in the actual measurement can be obtained by an approximate calculation such as an interpolate calculation, and the obtained relationship can be used in the correction.

Even when a sample to be measured or the like is placed in an arbitrary position on the weighing dish 3, the value of weighing which is obtained by correcting the output of the load detecting mechanism 1 as described above is always a value which does not contain a four-corner error or which is equivalent to that in the case where the sample is placed in the center on the weighing dish 3.

In the above, the embodiment in which strain gauges are used as the deflection amount sensors 5a to 5d for detecting deflection amounts of the respective cantilever beams 2a to 2d has been described. Alternatively, the deflection amount sensors 5a to 5d may be non-contact type sensors in which a light emitting device and a light receiving device are used. Namely, the following configuration may be employed. A pair of a light emitting device and a light receiving device are disposed for each of the cantilever beams 2a to 2d so that the beam crosses the gap between the light emitting device and the light receiving device. The amount of light incident on the light receiving device is changed in accordance with the deflection amount of the corresponding one of the beams 2a to 2d.

In the embodiment described above, the invention is applied to a so-called electromagnetic force balancing type electronic balance which includes an electromagnetic force balancing mechanism serving as the load detecting mechanism 1. It is a matter of course that the invention can be similarly applied to a so-called electronic scale in which a load sensor such as a load cell is used as the load detecting mechanism 1.

As described above, according to the invention, a dish support includes cantilever beams which respectively elongate in four directions, a weighing dish is supported by vicinities of tip ends of the cantilever beams, deflection amount detecting means is disposed in each of the cantilever beams, the deflection amount detecting means detecting a deflection amount of the cantilever beam, the position of the center of gravity of a load on the weighing dish is obtained from outputs of the deflection amount detecting means, a four-corner error of a load detection output of a load detecting mechanism is corrected by using previously stored relationships between the position of the center of gravity of a load and a four-corner error, and an indicated value of weighing is determined by using the corrected detection output. Therefore, a four-corner error can be eliminated without strictly adjusting a Roberval mechanism or the like of the load detecting mechanism, and hence without requiring skilled special technique.

As a result, the cost for adjustment in a production process can be reduced, and, even when a four-corner error is changed during use, readjustment can be easily conducted without requiring special technique.

Also with respect to an electronic balance in which a four-corner error is mechanically adjusted, even in the case where a four-corner error is not in proportional to the magnitude of the load and the deviation distance and elimination of a four-corner error by a mechanical adjustment only is therefore limited, the application of the invention can substantially eliminate a four-corner error.

What is claimed is:

1. An electronic balance comprising: a load detecting mechanism which supports a weighing dish via a dish support, and which outputs a signal corresponding to a load on said weighing dish; and calculating means for calculating a value of the load on said weighing dish by using an output of said load detecting mechanism, wherein said dish support comprises four cantilever beams which respectively elongate in four directions in a horizontal plane, vicinities of tip ends of said cantilever beams respectively supporting corners of said weighing dish, and said electronic balance further comprises: deflection amount detecting means for individually detecting a deflection amount of each of said cantilever beams; and four-corner error correcting and calculating means for calculating a position of a center of gravity of the load on said weighing dish by using a result of the detection of deflection amounts of said cantilever beams, for, by using previously stored relationships between a position of a center of gravity of a load and a four-corner error, correcting the output of said load detecting mechanism, and for causing the corrected output to be used in the calculation of the value of the load by said calculating means.

2. An electronic balance according to claim 1, wherein said load detecting mechanism is an electromagnetic force balancing mechanism which generates an electromagnetic force opposing the load on said weighing dish, and which detects the load on said weighing dish on a basis of a magnitude of the generated electromagnetic force.

3. An electronic balance according to claim 1, wherein said load detecting mechanism is a load cell to which a force corresponding to the load on said weighing dish is applied.

4. An electronic balance according to claim 1, 2, or 3, wherein said deflection amount detecting means for individually detecting the deflection amount of each of said cantilever beams are strain gauges.

5. An electronic balance according to claim 1, 2 or 3, wherein spacers are interposed between said cantilever beams of said dish support, and said weighing dish, respectively.

* * * * *